(12) United States Patent
Gil et al.

(10) Patent No.: US 8,199,360 B2
(45) Date of Patent: Jun. 12, 2012

(54) COOPERATIVE NEIGHBOR PRINTING SYSTEM PROFILE METHODS AND SYSTEMS

(75) Inventors: Alvaro Enrique Gil, Rochester, NY (US); Lalit Keshav Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1051 days.

(21) Appl. No.: 12/127,719

(22) Filed: May 27, 2008

(65) Prior Publication Data

US 2009/0296108 A1    Dec. 3, 2009

(51) Int. Cl.
*H04N 1/60*    (2006.01)
(52) U.S. Cl. .......................... 358/1.9; 358/501; 358/518
(58) Field of Classification Search .................. 358/1.1, 358/1.9, 3.23, 500, 501, 518, 523
See application file for complete search history.

(56) References Cited

U.S. PATENT DOCUMENTS

| | | | |
|---|---|---|---|
| 5,502,579 A | 3/1996 | Kita et al. | |
| 5,636,290 A | 6/1997 | Kita et al. | |
| 6,744,531 B1 | 6/2004 | Mestha et al. | |
| 7,209,145 B2 * | 4/2007 | Stevens | 345/601 |
| 8,014,033 B2 * | 9/2011 | Wang et al. | 358/3.23 |
| 8,023,156 B2 * | 9/2011 | Mestha et al. | 358/3.23 |

OTHER PUBLICATIONS

U.S. Appl. No. 12/127,643, filed May 27, 2008, Mestha et al.
U.S. Appl. No. 12/127,728, filed May 27, 2008, Maltz et al.
U.S. Appl. No. 12/127,473, filed May 27, 2008, Wang et al.
R. Bala, "Device Characterization", Chapter 5, Digital Color Imaging Handbook, Gaurav Sharma Ed., CRC Press, 2003.
R. Balasubramanian, R. Eschbach, "Design of UCR and GCR strategies to reduce moiré in color printing", IS&TPICS Conference, pp. 390-393, 1999.
R. Balasubramanian, R. Eschbach, "Reducing multi-separation color moiré via a variable undercolor removal and gray-component replacement strategy", Journal of Imaging Science & Technology, vol. 45, No. 2, pp. 152-160, Mar./Apr. 2001.
S. Dianat, LK Mestha, A. Mathew, "Dynamic Optimization Algorithm for Generating Inverse Printer Maps with Reduced Measurements," IEEE Int. Conference on Acoustics, Speech, and Signal Processing, May 14-19, 2006, Toulouse, France.
Mestha et al., "Gray Balance Control Loop for Digital Color Printing Systems," Xerox Corporation, Sep. 18-23, 2005, Baltimore MD, 6 pages.
U.S. Appl. No. 11/585,463, filed Oct. 24, 2006, Mestha et al.
U.S. Appl. No. 11/959,824, filed Dec. 19, 2007, Mestha et al.
U.S. Appl. No. 12/017,746, filed Jan. 22, 2008, Mestha et al.

* cited by examiner

*Primary Examiner* — Thomas D Lee
(74) *Attorney, Agent, or Firm* — Fay Sharpe LLP

(57) ABSTRACT

This disclosure provides printing methods, apparatus, and systems to generate a multidimensional printer profile for a color printer. Specifically, the profile is generated by a method of selecting a recruiter set of nodes associated with a plurality of target color nodes and selecting a candidate set of nodes associated with a plurality of target color nodes. The candidate nodes and recruiting node cooperate to generate a printer profile.

26 Claims, 8 Drawing Sheets

COOPERATIVE NEIGHBOR PRINTING SYSTEM PROFILE METHODS AND SYSTEMS

CROSS REFERENCE TO RELATED PATENTS AND APPLICATIONS

U.S. patent application Ser. No. 12/127,643, filed May 27, 2008, entitled "METHOD, APPARATUS AND SYSTEMS TO RETRIEVE GCRS FROM HISTORICAL DATABASE," by Mestha et al.;

U.S. patent application Ser. No. 12/127,728, filed May 27, 2008, entitled "PRINTER PROFILING METHOD, APPARATUS AND SYSTEMS FOR DETERMINING DEVICE AND GAIN MATRIX VALUES," by Maltz et al.;

U.S. patent application Ser. No. 12/127,473, filed May 27, 2008, entitled "METHODS, APPARATUS AND SYSTEMS FOR BLENDING MULTIPLE GCRS," by Wang et al.; and U.S. patent application Ser. No. 12/017,746, filed Jan. 22, 2008, entitled "METHOD AND APPARATUS FOR OPTIMUM BLACK COMPONENT DETERMINATION FOR GRAY COMPONENT REPLACEMENT" by Mestha et al. are herein incorporated by reference in their entirety.

BACKGROUND

In image production systems that produce images on a recording medium, such as printers, photocopiers, facsimile machines and other xerographic devices, it is desired to control, as closely as possible, the actual perceived color of the output images. One known method to optimize image color output is to provide a look-up-table (LUT) that translates received color signals into optimized color signals for printing, for example, on a printer.

It is known, for example, that in three-color spaces, such as a Cyan-Magenta-Yellow (CMY) color space, gray color is made up of equal, or near-equal amounts of each one of the colors of the three-color space. Each color in a three-color space which is made up of non-negligible amounts of all three primary colors of the color space can be viewed as having a gray component. Expanding the three-color space to include Black (K) allows then, for most colors in the color space, for a black (K) component to be added in substitution for the gray component. In such a solution, a three-input, four-output LUT is needed.

Adding black (K) as a fourth color in this manner usually saves cost, as black (K) ink is usually cheaper than colored ink, and allows more colors to be produced than were achievable with the original three primary colors. Controlled amount of black addition is considered useful for high quality printing. Having black gives better stability to prints in the presence of print variables (relative humidity, temperature, material latitude etc.,). Increased gamut for dark colors, as in DC8000, is also achieved with the addition of black toner. One major disadvantage in adding black is the excessive black in flesh tones, sky tones and other important tone scales can make these tone scales appear dirty/grainy or non-uniform with black toner. However, some key colors (e.g., flesh tones and sky tones) are sensitive to the addition of black and may not be perceived as optimal if too much black is added. The replacement of the inherent gray component of colors in a three-color space with a fourth, black (K) component is called gray component replacement (GCR) or under color removal (UCR). UCR is usually used when colors are near the neutral axis, such as, for example, the L* axis in L*a*b* space or the C=M=Y axis in CMY color space, GCR is similar to UCR, but can be used with colors throughout the color gamut, not just near or at neutral axes. The use of GCR and UCR is known to facilitate the production of pleasing color outputs, optimal gamut, and to improve constraints on area coverage.

Traditionally, determination of the black (K) component in a target color system was done in an ad hoc way by experienced practitioners. This method has the disadvantages of requiring experienced personnel, being generally irreproducible, being costly, and being time-consuming.

Another method used to transform colors in a three-dimensional color space, such as CMY color space, to a four-color color space, such as CMYK color space, is to determine the black (K) component by a one dimensional function that relates the black (K) component as a one-dimensional function of the other components. In the CMY color space, for example, the function K=min (C, M, Y) can be used. This method has the disadvantages of not producing sufficiently optimized colors for the entire color gamut, especially for specialized, or key, colors such as, for example, skin tones.

In another method, a flexible method for estimating the black (K) component comprises (1) determining a maximum black (K) component, (2) adjusting the black (K) component amounts based on chroma, and (3) determining the other color components. In examples of this method, disclosed in U.S. Pat. No. 5,502,579 to Kita et al, (Kita '529) and U.S. Pat. No. 5,636,290 to Kita et al. (Kita '290), input image signals are transformed by a four-input-three output controller to L*a*b* color space. The disclosure of each of Kita '529 and Kita '290 is incorporated herein by reference in its entirety. A chroma determining means determines chroma signal C* from a* and b*. A UCR ratio calculation means calculates a UCR ratio a from the chroma signal C*. The L*a*b* and UCR ratio are then converted into the CMYK output. This method also has the disadvantages of not producing sufficiently optimized colors for the entire color gamut.

In another method, disclosed in U.S. Pat. No. 6,744,531 to Mestha et al. (Mestha), incorporated herein by reference in its entirety, consistent output across multiple devices is obtained. For a given device, received device independent image data are stored as target image data and also converted by a data adjustment subsystem to printable image data based on the color space of the device. The printable image data is printed. An image sensor senses the printed image data and outputs detected device independent image data to the data adjustment subsystem. The data adjusting subsystem compares the detected device independent image data with the stored target image data and, based on the comparison, determines adjustment factors that are used to conform the printable image data output by the data adjusting subsystem to colors mandated by the device independent image data.

In R. Bala, "Device Characterization", Chapter 5, Digital Color Imaging Handbook, Gaurav Sharma Ed., CRC Press, 2003, several methods for determining the black (K) component are reviewed. One method is black addition in which the black (K) component is calculated as a function of a scaled inverse of L*. In another method, the black (K) component is calculated as a function of the minimum value of the other color components, such as C, M, and Y for the CMY color space. In a third method, a three input-four output transform, subject to imposed constraints, is used to calculate the black (K) component. The constraints placed on the transform include requiring the sum of the color component values at a node to be less than a threshold. For example, in CMYK color space, C+M+Y+K would be constrained to be less than a threshold. A second constraint is to constrain K to be a subset of the range between the minimum and maximum allowed K values.

Another method is discussed in (1) R. Balasubramanian, R. Eschbach, "Design of UCR and GCR strategies to reduce moire in color printing", IS&TPICS Conference, pp. 390-393 (1999) and (2) R. Balasubramanian, R. Eschbach, "Reducing multi-separation color moire via a variable undercolor removal and gray-component replacement strategy", Journ. Imaging Science & Technology, vol. 45, no. 2, pp. 152-160, March/April, 2001. A UCR/GCR strategy is proposed that is optimized to reduce moire. In this method, the UCR/GCR strategy is to characterize moire as a function of the color components and to select optimized output color components when the moire function is minimized.

It is desirable for high quality color printed images to not contain separation noise. Originally smooth images may not result in the same smoothness when printed due to non-uniqueness in the choice of CMYK separations since nodes that are in the neighborhood in the L*a*b* color space could be rendered using CMYK recipes that are far apart from each other. This can lead to formulation jumps. This problem is further intensified when the printer has nonlinearities that offer the possibility to reproduce a specific color (i.e., L*a*b*) with several CMYK recipes. In this disclosure are provided methods/apparatus/systems to derive an L*a*b* to CMYK LUT such that the transition between every neighborhood node in the LUT is smooth in the L*a*b* space as well as the CMYK space.

INCORPORATION BY REFERENCE

U.S. patent application Ser. No. 11/959,824, filed Dec. 19, 2007, entitled "METHOD FOR CLASSIFYING A PRINTER GAMUT INTO SUBGAMUTS FOR IMPROVED SPOT COLOR ACCURACY," by Mestha et al. is herein incorporated by reference in its entirety.

BRIEF DESCRIPTION

In one aspect of this disclosure, a method of generating a multidimensional printer profile for a color printer is disclosed. The method comprises a) receiving a plurality of target colors associated with a device independent color space, each target color associated with a respective node of a device independent space; b) selecting a first group of the nodes to represent a recruiter set of nodes including a plurality of recruiter nodes; c) selecting a second group of the nodes to represent a candidate set of nodes, the candidate set of nodes including a plurality of candidate nodes, the candidate set not including any recruiter nodes; d) determining the nearest candidate node to each recruiter node; e) calculating the device dependent color space representation of the recruiter nodes; f) calculating the device dependent color space representation of the nearest candidate nodes to each respective recruiter node as a function of the device dependent color space representation of the respective recruiter node; and g) generating the multidimensional printer profile by associating the recruiter set of nodes with their respective device dependent color space representations and associating the candidate nodes with their respective device dependent color space representations.

In another aspect of this disclosure, a printing apparatus controller is disclosed which comprises a computer-usable data carrier storing instructions that, when executed by the controller, cause the controller to perform a method for generating a multidimensional printer profile for a color printer, the method comprising a) receiving a plurality of target colors associated with a device independent color space, each target color associated with a respective node of a device independent space; b) selecting a first group of the nodes to represent a recruiter set of nodes including a plurality of recruiter nodes; c) selecting a second group of the nodes to represent a candidate set of nodes, the candidate set of nodes including a plurality of candidate nodes, the candidate set not including any recruiter nodes; d) determining the nearest candidate node to each recruiter node; e) calculating the device dependent color space representation of the recruiter nodes; f) calculating the device dependent color space representation of the nearest candidate nodes to each respective recruiter node as a function of the device dependent color space representation of the respective recruiter node; and g) generating the multidimensional printer profile by associating the recruiter set of nodes with their respective device dependent color space representations and associating the candidate nodes with their respective device dependent color space representations.

In still another aspect of this disclosure, a printing system is disclosed which comprises a color printing device configured to receive data representative of a color image to be marked on a media substrate; and a controller operatively connected to the color printing device, the controller configured to access a multidimensional printer profile LUT associating a plurality of colorimetric nodes with respective printing device dependent color space data representations, the printing device dependent color space data representations generated by the method comprising a) receiving a plurality of target colors associated with a device independent color space, each target color associated with a respective node of a device independent space; b) selecting a first group of the nodes to represent a recruiter set of nodes including a plurality of recruiter nodes; c) selecting a second group of the nodes to represent a candidate set of nodes, the candidate set of nodes including a plurality of candidate nodes, the candidate set not including any recruiter nodes; d) determining the nearest candidate node to each recruiter node; e) calculating the device dependent color space representation of the recruiter nodes; f) calculating the device dependent color space representation of the nearest candidate nodes to each respective recruiter node as a function of the device dependent color space representation of the respective recruiter node; and g) generating the multidimensional printer profile by associating the recruiter set of nodes with their respective device dependent color space representations and associating the candidate nodes with their respective device dependent color space representations wherein the controller accesses the printer profile LUT to provide printing device dependent color space data representations to the color printing device for marking on the media substrate.

DETAILED DESCRIPTION

Figure 1:
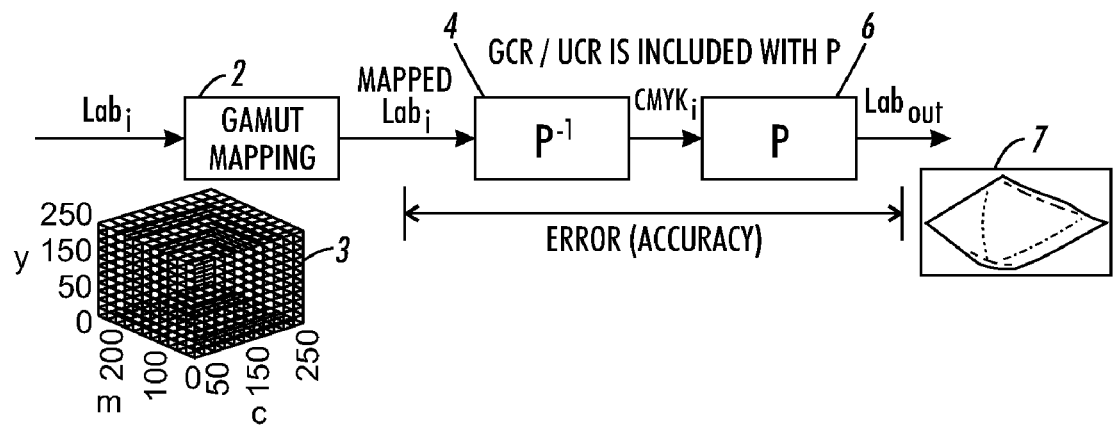
FIG. 1 schematically illustrates a gamut mapping and printer system according to an exemplary embodiment of this disclosure.

Printer profiles are used to find the device values needed to make a specified color, and are generally three dimensional colorimetric to device look up tables (LUTs). The embodiments discussed therein use an L*a*b* to a CMYK device space, though other color spaces could be used, for example RGB, CIE Lab, etc. These tables are generally of the order of 33×33×33 levels or smaller, so interpolation is used for finding the device values for input colors not on the nodes. These tables will be used for processing images with tens of millions of pixels, so the interpolation method should be simple and fast. Consequently, the nodes are on a rectangular grid to make it easy to find a sub-cube that contains the desired color, and some variation of linear interpolation between the device values at the corners of this sub-cube is used to find the device values for the desired color.

For the purpose of color correction using 3-dimensional lookup tables, a GCR strategy is derived. In basic terms as discussed in the background section, a GCR strategy involves suitably combining CMYK to provide pleasing color output, optimal gamut, constraints on area coverage, etc. See R. Bala, "Device characterization," Chapter 5, *Digital Color Imaging Handbook*, Gaurav Sharma Ed., CRC Press, 2003; R. Balasubramanian, R. Eschbach, "Design of UCR and GCR strategies to reduce moire in color printing," *IS&T PICS Conference*, pp. 390-393, (1999); and R. Balasubramanian, R. Eschbach, "Reducing multi-separation color moire via a variable undercolor removal and gray-component replacement strategy," *Journ. Imaging Science & Technology*, Volume 45, No. 2, pp. 152-160, March/April 2001. Components of profile LUTs are described in S. Dianat, L K Mestha, A. Mathew, "Dynamic Optimization Algorithm for Generating Inverse Printer Maps with Reduced Measurements," *IEEE Int. Conference on Acoustics, Speech, and Signal Processing*, May 14-19, 2006, Toulouse, France. Inverse printer model $P^{-1}$ is a mapping from uniformly/non-uniformly sampled device independent color space L*a*b* to device dependent color space. This is defined mathematically as $P^{-1}$: L*a*b*→CMYK. Out of gamut L*a*b* values are mapped to the boundary points of the printer's gamut using an appropriate gamut-mapping algorithm.

It is desirable for high quality color printed images to not contain separation noise. Original smooth images may not result in the same smoothness when printed due to non-uniqueness in the choice of CMYK separations since nodes that are in the neighborhood in the L*a*b* color space could be rendered using CMYK recipes that are far apart from each other. This can lead to formulation jumps. This problem is further intensified when the printer has nonlinearities that offer the possibility to reproduce a specific color (i.e., L*a*b*) with several CMYK recipes. In this disclosure, we provide a method to derive an L*a*b* to CMYK LUT such that the transition between every neighborhood node in the LUT is smooth in the L*a*b* space as well as the CMYK space. The smoothness is preserved by using a neighbor detection algorithm in L*a*b* space. Neighboring pairs cooperate mutually by exchanging information in order to guarantee a smooth transition between them in the CMYK space.

The creation of a L*a*b* to CMYK LUT can be performed via two different methods: (1) a LUT built on-line without previous smoothness, which creates a smooth LUT without any previous knowledge on all areas of the printer's gamut and (2) a LUT built on-line with previous smoothness, which contains a high resolution L*a*b* to CMYK table where smoothness has been previously applied to several areas of the printer's gamut. The details of both approaches is provided below.

With reference to FIG. 1, illustrated is a block diagram outlining a Lab to image output process according to an exemplary embodiment of this disclosure.

The system includes a Lab input, a gamut mapping process 2, an inverse printer model or inverse printer 4 to generate mapped Lab to CMYK and a printer model or printer which generates a Lab output. Error/accuracy is determined based on the difference between the Lab input and Lab output.

The disclosed embodiments rely on the fact that if the $CMYK_A$ values of a particular node A is known, then it is possible to estimate the "closest" $CMYK_B$ values of the "closest" node B, with respect to node A, in terms of distance metrics in the L*a*b* space (e.g., deltaE2000 or deltaE CIE). This fact is very important for nonlinear printers that have the peculiarity of producing the same L*a*b* value by means of multiple CMYK values. When the multiple CMYK solution is present at the moment of deciding a CMYK recipe for a particular node, then the disclosed embodiments offer the possibility of selecting one CMYK out of the multiple solutions, which is in turn close to the CMYK recipe of a neighboring node.

In order to create smooth LUTs, we define two groups that contain sets of L*a*b* values. The first group is called the "recruiting set" that contains one or more L*a*b* values with their respective CMYK values. The second group is called the "candidate set" that contains the in-gamut L*a*b* in the LUT. The goal of the recruiting set is to determine potential nodes from the candidate set that could become part of the recruiting set. The goal of the candidate set is to market themselves before the recruiting set in order to be recruited.

Figure 2:
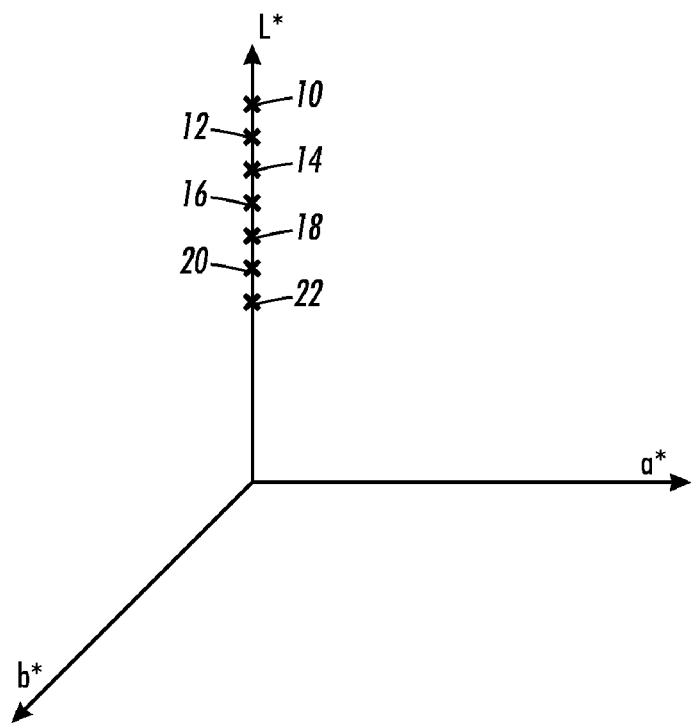
FIG. 2 illustrates a recruiting set of nodes according to an exemplary embodiment of this disclosure.

First, an LUT without previous smoothness will be described. According to one exemplary embodiment of this disclosure, this can be implemented by applying the following steps:

1. Define a recruiting set R={1, 2, . . . , N} that contains N>=1 L*a*b* nodes. The location of these nodes in the L*a*b* space can be decided by the designer. One option is to allocate one or more nodes along the neutral axis. Other options could also be nodes along the brown axis; nodes on the boundary; nodes located in skin regions; etc. With reference to FIG. 2, a set of recruiting nodes 10, 12, 14, 16, 18, 20 and 22 are shown along the neutral axis.

2. Use a desired GCR to compute the CMYK values of any node in the recruiting set.

3. Define a candidate set C={1, 2, ..., M} that contains M number of L*a*b* nodes. This list comes from all the nodes in the LUT.

Figure 3:
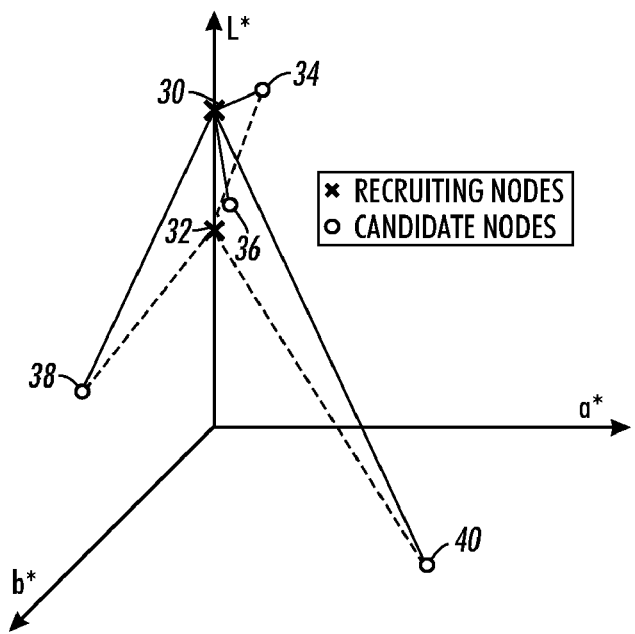
FIG. 3 illustrates a recruiting set of nodes and corresponding candidate set of nodes according to an exemplary embodiment of this disclosure.

4. Compute the metric L*a*b* distance between each node i ∈ R and j ∈ C. One metric that could be used here is the deltaE2000 formula. Another choice is deltaE CIE. For example, FIG. 3 illustrates distances between both recruiting and candidate nodes 34, 36, 38 and 40. This only shows one way to process nodes contained in the candidate set in a certain way; however, this method is not restricted to this order. There is freedom in selecting the order in which nodes contained in the candidate set could be processed.

Figure 4:
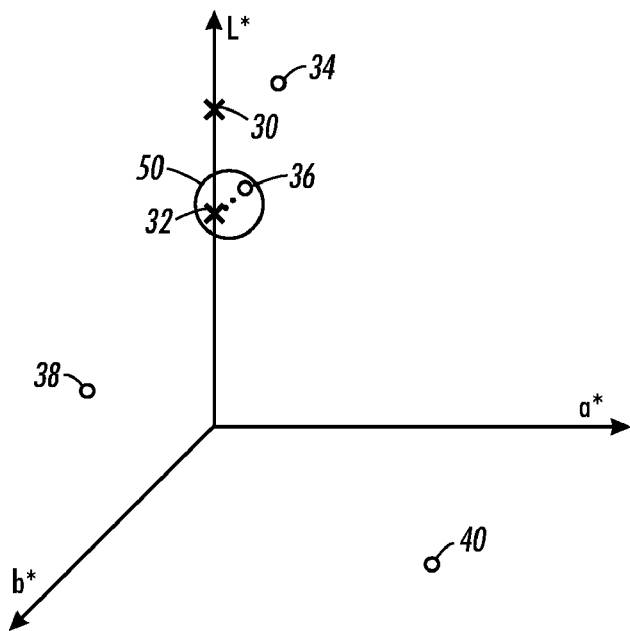
FIG. 4 illustrates a method of node selection according to an exemplary embodiment of this disclosure.

5. Determine the minimum distance, min dE2000ij, between a recruiting and candidate node. This node is denoted as j* (see FIG. 4, reference character 50).

Figure 5:
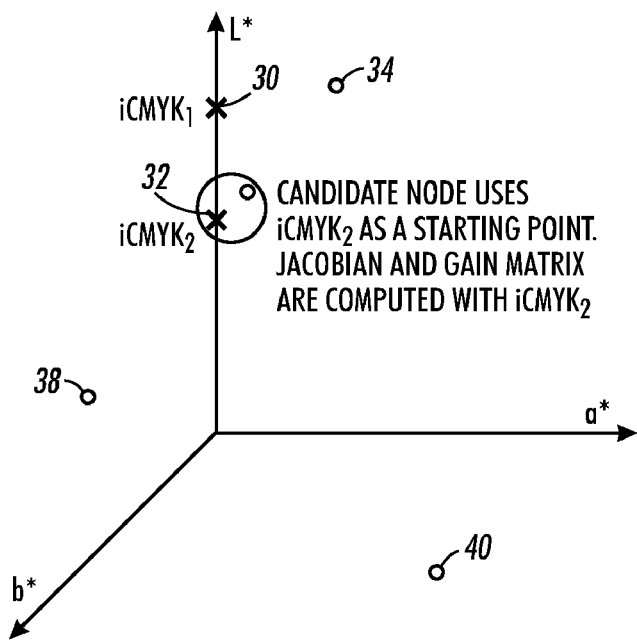
FIG. 5 illustrates the cooperation between recruiting and candidate nodes according to one aspect of this disclosure.

6. Compute the CMYK of closest node using as a starting point the CMYK of a node in the recruiting set (see FIG. 5). The recruiting process is neighbor driven since it always selects the nodes with the minimum distance between any recruiting and candidate nodes. Once a pair of nodes has been identified, then the cooperation takes place since the CMYK values of the recruiting set is shared with the candidate set. The candidate node may use a MIMO controller to iterate several times and converge to a new CMYK value that is close to its closest neighbor. This is possible since the candidate set computes the Jacobian, using the CMYK of the recruiting node, which supplies information about the local gradient of a neighboring color to the candidate node. By using the local gradient, the MIMO controller converges to the closest CMYK solution to the one that the recruiting node has.

Figure 6:
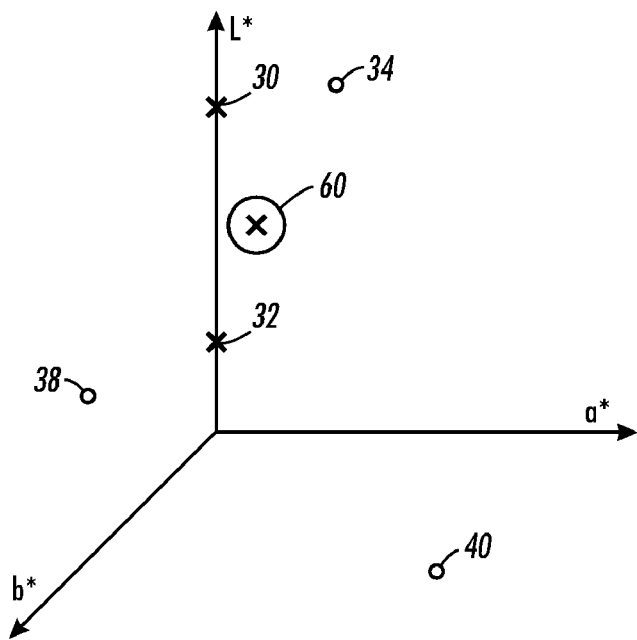
FIG. 6 illustrates a former candidate node selected as a new recruiting node according to one aspect of this disclosure.

7. The closest node identified in 5 now becomes part of the recruiting node set, i.e., R=R+{j*}, and no longer belongs to the candidate set, i.e, C=C−{j*} (see FIG. 6, reference character 60).

8. Repeat process from 5 to 8 until set C is empty, that is, there are no more candidates to recruit.

Notably, step 6 computes the Jacobian and controller's parameters using only local information of the recruiting node. These values remain fixed during the controller's iterations. Alternatively, the process may compute the Jacobian and controller's parameters at each iteration since this could better capture the nonlinearities present in the printer. This option will improve the ability of the controller to converge to the closest CMYK value. This can be especially important to implement when the nodes in the candidate set are scarce.

Once this process is finished, all the information needed to build the LUT using the L*a*b* and CMYK values originally located in the recruiting set is available.

Next is described how to construct an LUT with previous smoothness. This method actually builds upon the application of all steps described above for a high density LUT created in the candidate set. The motivation to use a high density LUT is to populate the printer's gamut with a relatively large number of nodes that are close enough to each other and where the benefits of sharing information can be exploited, which in turn, will result in a smooth LUT. Once this high resolution LUT is created, the following steps are implemented on-line:

1. Compute the metric L*a*b* distance between every node in the high definition LUT and every node contained in the LUT of interest.

2. Determine the minimum distance, min dE2000ij, in step 1.

3. Compute the CMYK of the closest node using as a starting point the CMYK of a node in the high definition LUT.

4. Repeat process from 1 to 4 until all nodes in the LUT of interest have computed their respective CMYK values.

The sharing of information combined with control systems is used to implement tracking systems to compute the closest CMYK of the selected color in the candidate set to the CMYK of the color in the recruiting set. A MIMO state-feedback controller can update the CMYK recipe that will accurately reproduce the given target L*a*b* value (see FIG. 7). The system in FIG. 7 can be expressed as a state equation with the form:

$$x(k+1)=Ax(k)+Bu(k)$$

where x(k) represents the measured or estimated L*a*b* values obtained from the inline/offline sensor or a printer model respectively at iteration k, A is the identity matrix, B is the Jacobian matrix computed around the initial CMYK value, and u(k) is the control law applied to the input of the printer. The Jacobian B is computed as follows:

$$B = \begin{bmatrix} \frac{\partial L}{\partial C} & \frac{\partial L}{\partial M} & \frac{\partial L}{\partial Y} & \frac{\partial L}{\partial K} \\ \frac{\partial a}{\partial C} & \frac{\partial a}{\partial M} & \frac{\partial a}{\partial Y} & \frac{\partial a}{\partial K} \\ \frac{\partial b}{\partial C} & \frac{\partial b}{\partial M} & \frac{\partial b}{\partial Y} & \frac{\partial b}{\partial K} \end{bmatrix}$$

Figure 7:
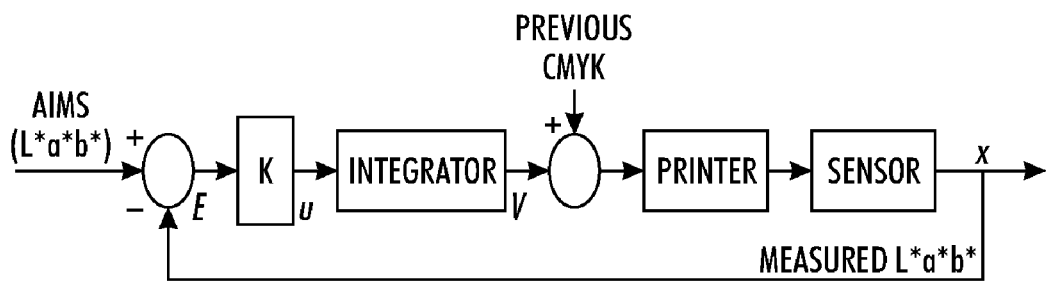
FIG. 7 illustrates a state-feedback control system to generate CMYK recipes in cooperative neighbor mode according to an exemplary embodiment of this disclosure.
Figure 8:
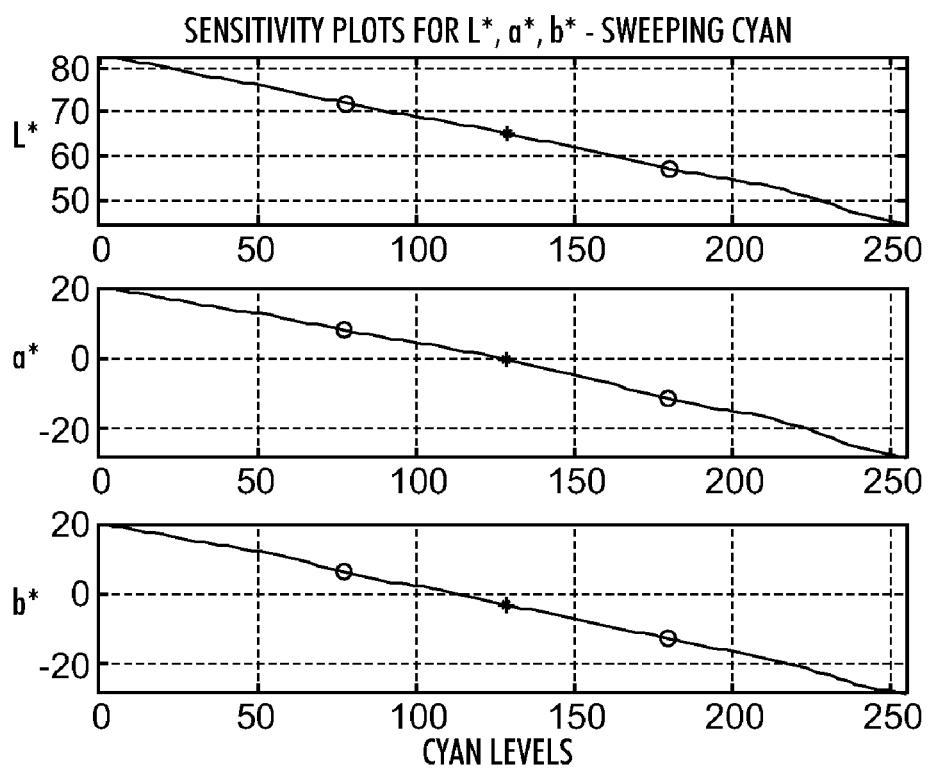
FIG. 8 illustrates sensitivity plots for cyan levels according to one aspect of this disclosure.
Figure 9:
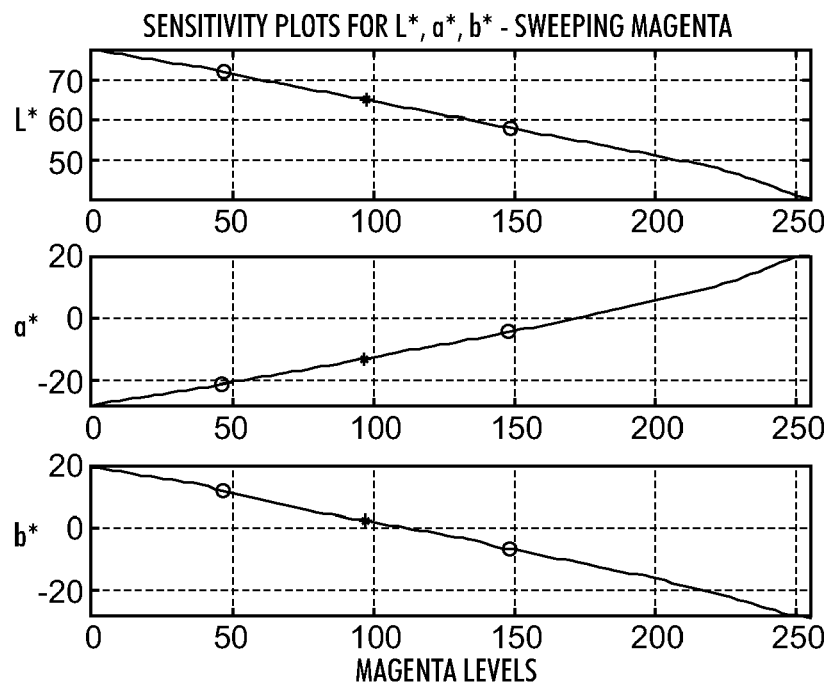
FIG. 9 illustrates sensitivity plots for magenta levels according to one aspect of this disclosure.
Figure 10:
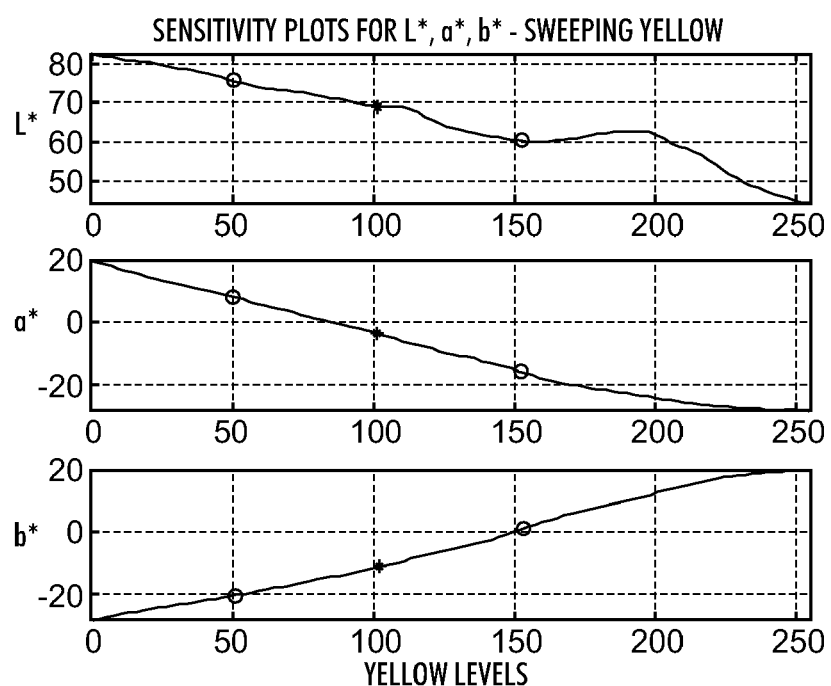
FIG. 10 illustrates sensitivity plots for yellow levels according to one aspect of this disclosure.
Figure 11:
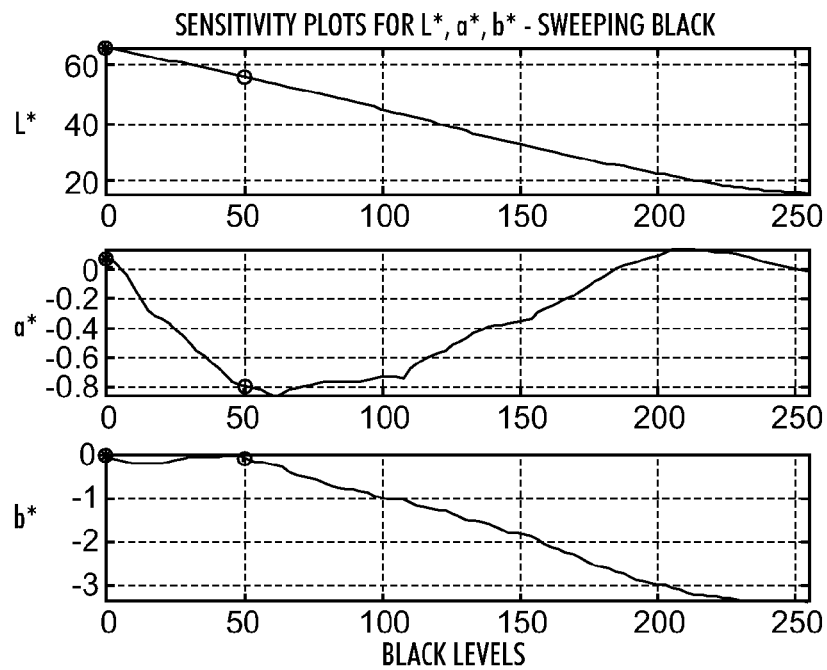
FIG. 11 illustrates sensitivity plots for black levels according to one aspect of this disclosure.
Figure 12:
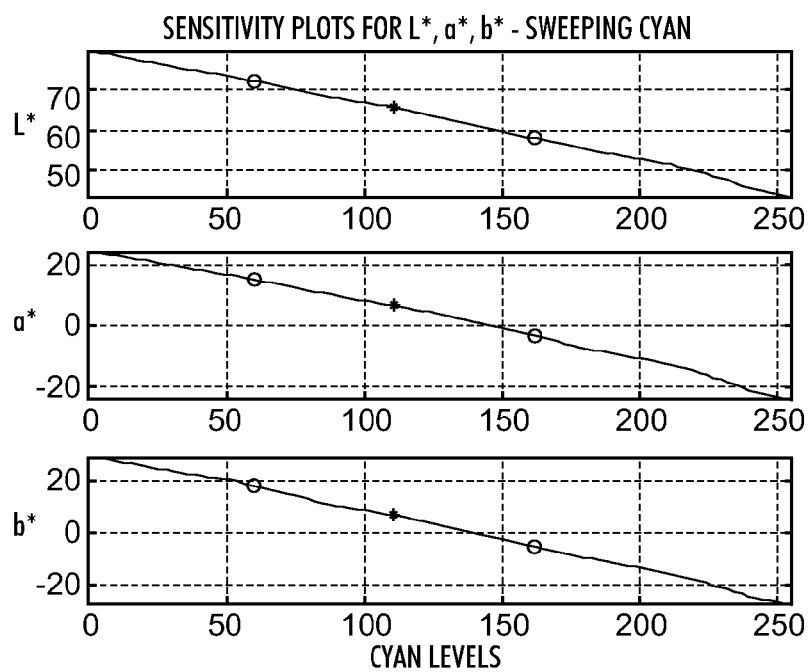
FIG. 12 illustrates sensitivity plots for cyan levels according to one aspect of this disclosure.
Figure 13:
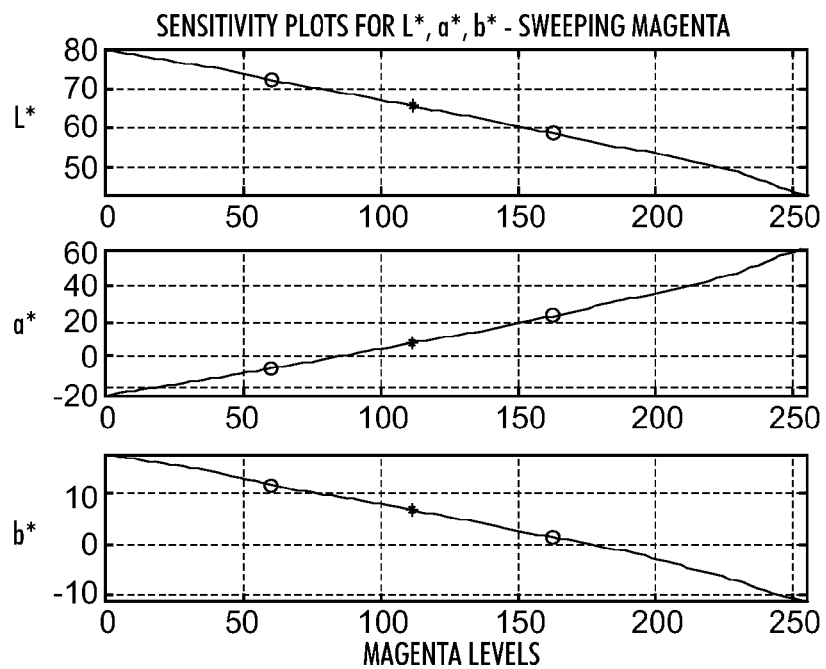
FIG. 13 illustrates sensitivity plots for magenta levels according to one aspect of this disclosure.
Figure 14:
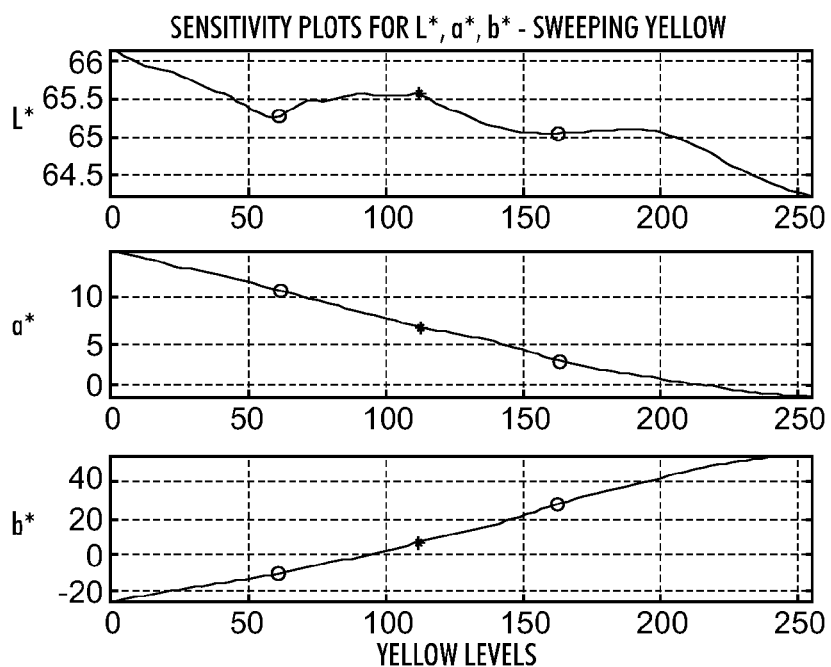
FIG. 14 illustrates sensitivity plots for yellow levels according to one aspect of this disclosure.
Figure 15:
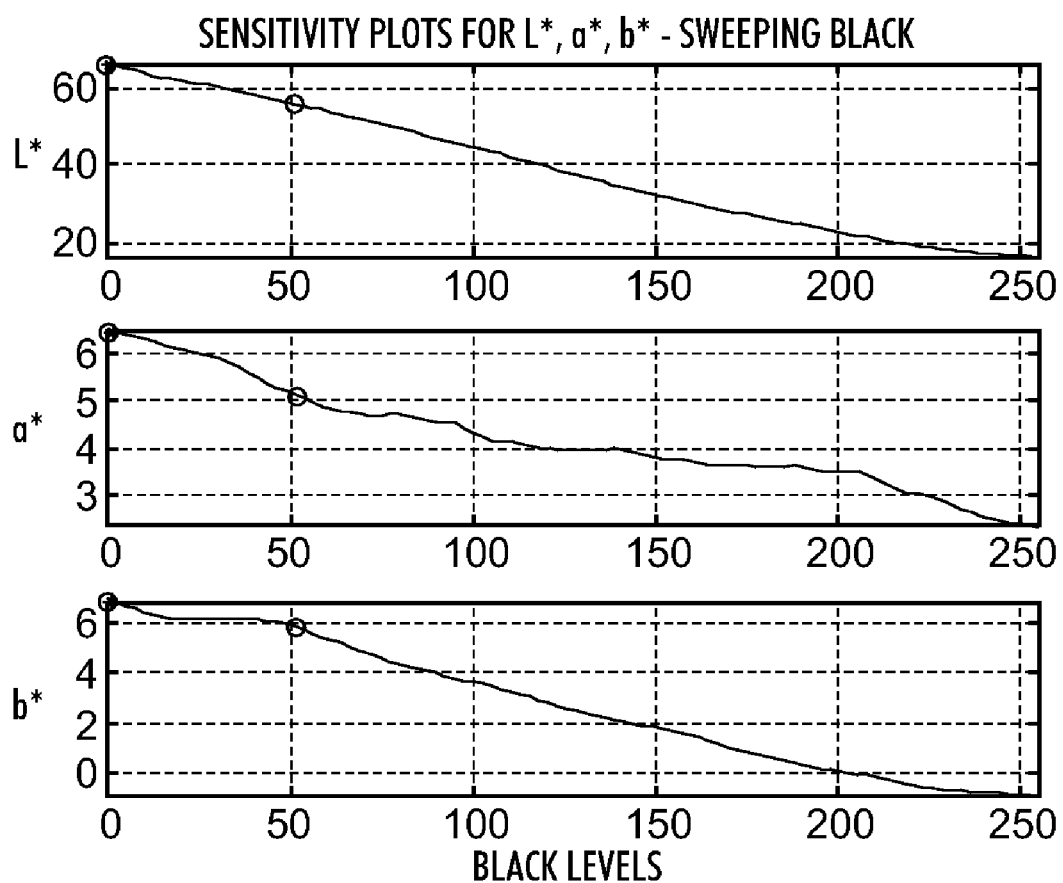
FIG. 15 illustrates sensitivity plots for black levels according to one aspect of this disclosure.

The control law is designed using MIMO state-feedback controllers. Thus, u(k)=−Ke(k), where e(k) is the error between the target L*a*b* and the measured or estimated L*a*b* at iteration k. The gain matrix, K, is derived based on the pole values specified such that closed loop shown in FIG. 7 is stable.

Notably, the Jacobian and controller's parameters of the closest candidate node are only computed using local information of the recruiting node. These values remain fixed during all controller's iterations. As an alternative, it is suggested the Jacobian and controller's parameters can be computed at each iteration since this could better capture the nonlinearities present in the printer. This option will provide improved convergence to the closest CMYK value. This is especially important to implement when the nodes in the candidate set are scarce. Once this process is finished, all the information needed to build the LUT using the L*a*b* and CMYK values originally located in the recruiting set is present.

Several plots are shown that confirm the embodiments disclosed herein can compute the closest CMYK of the selected color in the candidate set to the CMYK of the color in the recruiting set. Suppose initially there are 24 recruiting nodes along the neutral axis with values from L*a*b*=[15 0 0] to L*a*b*=[100 0 0]. The L* values for the recruiting nodes are uniformly incremented by 5 units. Then two colors in the candidate set are selected to support the disclosed findings, i.e., $L^*a^*b^*_1$=[56.65 6.42 6.5] (Color #1) and $L^*a^*b^*_2$=[68.23 6.43 6.49] (Color #2). Color #1 is first selected since the algorithm determines that it is the closest node (minimum deltaE2000 distance) to the node in the recruiting set with L*a*b*=[65 0 0] and CMYK=[128.97 97.42 101.78 0.07]. Sensitivity plots for [128.97 97.42 101.78 0.07] are shown in FIGS. 8-11.

With reference to FIGS. 8-11, sensitivity plots for CMYK=[128.97 97.42 101.78 0.07] are shown. The stars indicate the nominal values whereas the circles indicate the points used to compute the Jacobian around the nominal point.

Notably, in order to get the $L^*a^*b^*_1$=[56.65 6.42 6.5] values of the first color, the controller has to track the sensitivity plots shown in FIGS. 8-11. This means the controller will iteratively modify the CMYK values until the desired L*a*b* values are reached. By following the trajectories provided by the sensitivity plots, it is apparent there is a unique CMYK solution for any candidate color; an important criteria to implement where neighboring colors are located in nonlinear region of the printer's gamut. The approximate CMYK=[123.6 139.5 118.5 43] values for color #1 could be inferred by the sensitivity plots; however, this will result in some inaccuracy since the plots do not account for any interactions between colors. The final CMYK values obtained using this approach are [111.01 111.47 112.27 1.19]. Thus, this node, color #1, will now be part of the recruiting set.

Next color #2 is processed and the algorithm detects that it is close to the node that has L*a*b*=[56.65 6.42 6.5] and CMYK=[1 11.01 111.47 112.27 1.19], which is color #1 that has recently joined the recruiting team. Sensitivity plots for [111.01 111.47 112.27 1.19] are shown in FIGS. 12-15.

With reference to FIGS. 12-15, sensitivity plots for CMYK=[111.01 111.47 112.27 1.19] are shown. The stars indicate the nominal values whereas the circles indicate the points used to compute the Jacobian around the nominal point.

Notably, in order to get the L*a*b*$_2$[68.23 6.43 6.49] values of the second color, the controller will iteratively modify the CMYK values until the desired L*a*b* values are reached. For this case, the approximate CMYK=[88 113.3 112 0] values for color #2 could be inferred by the sensitivity plots; however, this will again result in some inaccuracy since the plots do not account for any interactions between colors. The final CMYK values obtained using this approach are [100.03 103.33 104.10 0].

The two cases mentioned above show how a controller can be used to track the trajectories of neighboring nodes in such a way that the obtained new CMYK values are closest to the selected neighbor. It also shows that there exists only one feasible solution to the posed problem.

The embodiments disclosed herein can achieve both a node's accuracy and smoothness in one step. The process only requires the L*a*b* and CMYK values of all the nodes in the recruiting set so there is no need to have a priori information from any GCR since this process naturally defines a smooth GCR. A multidimensional smoothing algorithm would be required to further smoothen the CMYK values of the nodes. Notably, the definition of this GCR could be done by only having one node in the recruiting set. The derivation of other GCR techniques usually starts by defining a smooth function for only black, which is applied to all colors inside the gamut. It then determines a CMY that along with the K value coming from the smooth function will match the L*a*b* value for that particular node. This is done in a greedy fashion since no information about neighboring colors is taken into account, so even though K is smooth, this could result in non-smooth transitions in the CMYK space between neighboring nodes. The Neighbor Driven approach seeks to smooth CMYK solutions for all nodes in the gamut.

Described heretofore is how to derive an L*a*b* to CMYK LUT such that the transition between every neighborhood node in the LUT is smooth in the L*a*b* space as well as the CMYK space. Any smoothness is preserved by using both MIMO control algorithm and the neighbor detection algorithm in L*a*b* space. Cooperation between neighbors by implementing tracking algorithms provides a unique solution for the node contained in the candidate set.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer implemented method of generating a multidimensional printer profile for a color printer, the method comprising:
   a) receiving a plurality of target colors associated with a device independent color space, each target color associated with a respective node of the device independent color space;
   b) selecting a first group of the nodes to represent a recruiter set of nodes including a plurality of recruiter nodes;
   c) selecting a second group of the nodes to represent a candidate set of nodes, the candidate set of nodes including a plurality of candidate nodes, the candidate set not including any recruiter nodes;
   d) determining the nearest candidate node to each recruiter node;
   e) calculating the device dependent color space representation of the recruiter nodes;
   f) calculating the device dependent color space representation of the nearest candidate nodes to each respective recruiter node as a function of the device dependent color space representation of the respective recruiter node; and
   g) generating the multidimensional printer profile by associating the recruiter set of nodes with their respective device dependent color space representations and associating the candidate nodes with their respective device dependent color space representations.

2. The computer implemented method of generating a multidimensional printer profile for a color printer according to claim 1, step d) comprising:
   calculating the distance between each recruiter node and the candidate nodes and
   determining the nearest candidate node to each recruiter node based on the calculated distances.

3. The computer implemented method of generating a multidimensional printer profile for a color printer according to claim 1,
   step c) comprising:
   the candidate set of nodes including a plurality of candidate nodes, the candidate set including any recruiting nodes;
   step e) comprising:
   calculating the device dependent color space representations of the recruiter nodes as a function of a predetermined GCR strategy defined for the recruiting set; and
   step f) comprising:
   calculating the device dependent color space representation of the nearest candidate node to each respective recruiter node as a function of the device dependent color space representation of the respective recruiter node calculated using the predetermined GCR strategy.

4. The computer implemented method of generating a multidimensional printer profile for a color printer according to claim 1, wherein the device independent color space is L*a*b* and the device dependent color space is CMYK.

5. The computer implemented method of generating a multidimensional printer profile for a color printer according to claim 1, wherein the first device dependent color space is RGB and the second device dependent color space is CMYK.

6. The computer implemented method of generating a multidimensional printer profile for a color printer according to claim 1, comprising:

h) selecting the nearest candidate nodes to be included in the recruiter set of nodes; and repeating steps d) through g).

7. The computer implemented method of generating a multidimensional printer profile for a color printer according to claim 6, wherein steps h), and d) through g) are repeated until all candidate nodes have been transformed to recruiter nodes.

8. The computer implemented method of generating a multidimensional printer profile for a color printer according to claim 1, wherein the multidimensional printer profile is a multidimensional look-up table (LUT).

9. The computer implemented method of generating a multidimensional printer profile for a color printer according to claim 1, step f) comprising:
iteratively calculating the device dependent color space representation of the nearest candidate nodes by using the device dependent color space representations of the respective recruitment node as an initial device dependent color space representation of the respective nearest candidate node, wherein a target color error is determined for each iteration using one of a color printer model and printer.

10. The computer implemented method of generating a multidimensional printer profile for a color printer according to claim 9, wherein a gain matrix is used to iteratively calculate the device dependent color space representation of the nearest candidate nodes.

11. The computer implemented method of generating a multidimensional printer profile for a color printer according to claim 10, wherein the gain matrix is a function of a Jacobian matrix associated with the recruiter nodes.

12. The computer implemented method of generating a multidimensional printer profile for a color printer according to claim 1, wherein the recruiter set selected in step b) is associated with one of the neutral axis, the brown axis, a gamut boundary, skin tones, and sky tones.

13. A printing apparatus controller comprising:
a non-transitory computer-usable data carrier storing instructions that, when executed by the controller, cause the controller to perform a method for generating a multidimensional printer profile for a color printer, the method comprising:
a) receiving a plurality of target colors associated with a device independent color space, each target color associated with a respective node of the device independent space;
b) selecting a first group of the nodes to represent a recruiter set of nodes including a plurality of recruiter nodes;
c) selecting a second group of the nodes to represent a candidate set of nodes, the candidate set of nodes including a plurality of candidate nodes, the candidate set not including any recruiter nodes;
d) determining the nearest candidate node to each recruiter node;
e) calculating the device dependent color space representation of the recruiter nodes;
f) calculating the device dependent color space representation of the nearest candidate nodes to each respective recruiter node as a function of the device dependent color space representation of the respective recruiter node; and
g) generating the multidimensional printer profile by associating the recruiter set of nodes with their respective device dependent color space representations and associating the candidate nodes with their respective device dependent color space representations.

14. The printing apparatus controller according to claim 13, step d) comprising:
calculating the distance between each recruiter node and the candidate nodes and
determining the nearest candidate node to each recruiter node based on the calculated distances.

15. The printing apparatus controller according to claim 13,
step e) comprising:
calculating the device dependent color space representations of the recruiter nodes as a function of a predetermined GCR strategy; and
step f) comprising:
calculating the device dependent color space representation of the nearest candidate node to each respective recruiter node as a function of the device dependent color space representation of the respective recruiter node calculated using the predetermined GCR strategy.

16. The printing apparatus controller according to claim 13, wherein the device independent color space is $L^*a^*b^*$ and the device dependent color space is CMYK.

17. The printing apparatus controller according to claim 13, the method comprising:
h) selecting the nearest candidate nodes to be included in the recruiter set of nodes; and
repeating steps d) through g).

18. The printing apparatus controller according to claim 17, wherein steps h), and d) through g) are repeated until all candidate nodes have been transformed to recruiter nodes.

19. The printing apparatus controller according to claim 13, wherein the multidimensional printer profile is a multidimensional look-up table (LUT).

20. The printing apparatus controller according to claim 13, step f) comprising:
iteratively calculating the device dependent color space representation of the nearest candidate nodes by using the device dependent color space representations of the respective recruitment node as an initial device dependent color space representation of the respective nearest candidate node, wherein a target color error is determined for each iteration using one of a color printer model and a printer.

21. The printing apparatus controller according to claim 20, wherein a gain matrix is used to iteratively calculate the device dependent color space representation of the nearest candidate nodes.

22. The printing apparatus controller according to claim 21, wherein the gain matrix is a function of a Jacobian matrix associated with the recruiter nodes.

23. The printing apparatus controller according to claim 13, wherein the recruiter set selected in step b) is associated with one of the neutral axis, the brown axis, a gamut boundary, skin tones, and sky tones.

24. A printing system comprising:
a color printing device configured to receive data representative of a color image to be marked on a media substrate; and
a controller operatively connected to the color printing device, the controller configured to access a multidimensional printer profile LUT associating a plurality of colorimetric nodes with respective printing device dependent color space data representations, the printing device dependent color space data representations generated by the method comprising:

a) receiving a plurality of target colors associated with a device independent color space, each target color associated with a respective node of device independent space;
b) selecting a first group of the nodes to represent a recruiter set of nodes including a plurality of recruiter nodes;
c) selecting a second group of the nodes to represent a candidate set of nodes, the candidate set of nodes including a plurality of candidate nodes, the candidate set not including any recruiter nodes;
d) determining the nearest candidate node to each recruiter node;
e) calculating the device dependent color space representation of the recruiter nodes;
f) calculating the device dependent color space representation of the nearest candidate nodes to each respective recruiter node as a function of the device dependent color space representation of the respective recruiter node; and
g) generating the multidimensional printer profile by associating the recruiter set of nodes with their respective device dependent color space representations and associating the candidate nodes with their respective device dependent color space representations,
wherein the controller accesses the printer profile LUT to provide printing device dependent color space data representations to the color printing device for marking on the media substrate.

25. The printing system according to claim 24, the method comprising:
h) selecting the nearest candidate nodes to be included in the recruiter set of nodes; and
repeating steps d) through g).

26. The printing system according to claim 25, wherein steps h), and d) through g) are repeated until all candidate nodes have been transformed to recruiter nodes.

* * * * *